United States Patent [19]
Grundei

[11] Patent Number: 5,785,160
[45] Date of Patent: Jul. 28, 1998

[54] PISTON WITH DIRECTION-DEPENDENT ADVANCE OPENING CROSS SECTIONS

[75] Inventor: Manfred Grundei, Niederwerrn, Germany

[73] Assignee: Fichtel & Sachs AG, Schweinfurt, Germany

[21] Appl. No.: 678,388

[22] Filed: Jun. 28, 1996

[30] Foreign Application Priority Data

Jun. 28, 1995 [DE] Germany ............ 195 23 397.2

[51] Int. Cl.$^6$ .................................................. F16F 9/32
[52] U.S. Cl. ............................ 188/322.15; 188/282.6; 188/322.22
[58] Field of Search ............ 188/322.15, 322.22, 188/322.18, 322.13, 316, 317, 318, 320, 281, 282, 280, 282.1, 282.5, 282.6, 282.8; 267/120, 124, 127, 129, 126

[56] References Cited

U.S. PATENT DOCUMENTS 5,615,756  4/1997  Grundei et al. ............ 188/322.15

FOREIGN PATENT DOCUMENTS

| | | |
|---|---|---|
| 0160275 | 11/1985 | European Pat. Off. . |
| 61116136 | 6/1986 | European Pat. Off. . |
| 2066332 | 3/1990 | European Pat. Off. . |
| 0481469 | 4/1992 | European Pat. Off. . |
| 2441751 | 6/1980 | France . |
| 0705845 | 5/1941 | Germany . |
| 7021105 | 6/1970 | Germany . |
| 2059682 | 6/1972 | Germany . |
| 8503460 | 9/1985 | Germany . |
| 4033186 | 4/1992 | Germany . |
| 4302624 | 5/1994 | Germany . |
| 4342755 | 6/1995 | Germany . |
| 4410996 | 6/1995 | Germany . |
| 4-102737 | 4/1992 | Japan ............ 188/322.15 |

*Primary Examiner*—Douglas C. Butler
*Attorney, Agent, or Firm*—Nils H. Ljungman and Associates

[57] ABSTRACT

A vibration damper has a cylinder tube which is divided into two work chambers by a piston, which is fastened to a piston rod. The piston has a piston body which has fluid passage channels which are covered by valve discs on supporting bodies with valve support surfaces, and the piston body is in a sliding or frictional connection, by way of at least one piston ring, with the cylinder tube. The piston ring covers the peripheral surface of the piston body and is axially supported respectively on the upper side and the lower side of the piston. The piston body is in a disc-shape, is in one piece and is manufactured by stamping. Starting from the piston base body, the piston body areas which are raised on one side of the piston are depressions on the axially opposite side of the piston. The piston ring is able to move axially as a function of the direction of movement, and is actuated by the friction force between the cylinder tube and the piston ring. Between the surface of the piston ring facing the piston and the surface of the piston, there is at least one advance opening cross section which is opened as a function of the axial position of the piston ring in relation to the piston body.

20 Claims, 5 Drawing Sheets

PRIOR ART

1

PISTON WITH DIRECTION-DEPENDENT ADVANCE OPENING CROSS SECTIONS

BACKGROUND OF THE INVENTION

1. Field of the Invention

The present invention relates to a vibration damper.

2. Background Information

The vibration dampers of the prior art often have a piston body which is made of a sintered material. For strength reasons, a minimum height is required, which has an effect on the stroke length. The piston valves are also generally designed for a specified characteristic, i.e., one which is strongly degressive. Adaptations are made by means of advance opening discs. Therefore the concept of standardization can only be realized to a limited extent.

German Laid Open Patent Application No. 20 59 682 describes vibration dampers, the cylinder tube of which is divided into two work chambers by a piston which is fastened to a piston rod, whereby the piston comprises a piston body with fluid passage channels which are covered by valve discs on support bodies with valve support surfaces, and the piston body is in a frictional (or sliding) connection with the cylinder tube by means of at least one piston ring.

European Laid Open Patent Application No. 160 275 A1 and German Patent No. 43 02 624 C1 teach that a multi-port piston body can be manufactured from stamped sheet metal as an alternative to the use of sintered material. As a result of the relatively complicated design of the individual sheet metal parts, fabrication tolerances must be taken into consideration, which have a negative influence on the allowable fluctuations of the damping force.

German Patent No. 705 845 discloses a hydraulic shock absorber in which, inside an expanded ring-shaped groove, there is a piston ring which can move axially, which controls a flow passage which is parallel to an additional passage which connects the two work chambers.

OBJECT OF THE INVENTION

One object of the present invention is the provision of a vibration damper which has a piston which is of a low height, and a vibration damper which also has the capability of setting the damping force as a function of the direction.

SUMMARY OF THE INVENTION

A ring-shaped groove like the one provided in other similar vibration dampers can be advantageously eliminated. Such a ring-shaped groove undesirably increases the height of the piston, which results in a loss of flexibility. Moreover, such a ring-shaped groove must generally be produced at least mechanically, and generally by cutting and machining. A significant advantage of the invention is that as a result of the particular arrangement of the advance opening cross section, a relatively large cross section can be created which still has small dimensions, since the diameter of the reference circle on which the advance opening cross section is located is relatively large.

In an additional configuration of the invention, an additional advance opening cross section is switched in parallel to the switchable advance opening cross section. If, for any reason, the changeable cross section should be blocked, the entire vibration damper will of course not operate with the same level of comfort which is possible under ideal conditions, but it will eliminate the possibility of an excessively hard reaction.

2

The invention teaches that the advance opening cross section is connected to an advance opening channel which is located in the vicinity of the peripheral surface of the piston body and connects the upper side of the piston with the lower side of the piston, whereby the passage of the advance opening channel is defined by the piston ring. The advance opening channel has a larger cross section than the advance opening cross section. Consequently, the advance opening channel has no influence on the damping force characteristic in the advance opening range. Moreover, fluctuations in viscosity no longer have such a significant effect, since the advance opening cross section has only a small longitudinal dimension in the direction of flow.

With regard to the maximum possible standardization of the overall piston, the advance opening cross section is realized in the piston body. During stamping, all the parts of the advance opening cross section can very easily be stamped in one additional working step. The piston body can be used as a basic part for many different applications. If the advance opening cross section were placed in the piston ring, then an individual piston ring would have to be defined for each application.

To prevent under all conditions an unintentional closure of the advance opening cross section by the piston ring, the advance opening cross section has at least one inflow channel, the radial dimension of which, starting from the peripheral surface of the piston body, is greater than the cover surfaces of the piston ring on the underside of the piston. For reasons of tool wear, each inflow channel extends from the peripheral surface to a fluid passage channel which has the same direction of flow. It is therefore possible to work the inflow channel into the piston body at a constant depth.

The above discussed embodiments of the present invention will be described further hereinbelow with reference to the accompanying figures. When the word "invention" is used in this specification, the word "invention" includes "inventions", that is, the plural of "invention". By stating "invention", the Applicant does not in any way admit that the present application does not include more than one patentably and non-obviously distinct invention, and maintains that this application may include more than one patentably and non-obviously distinct invention. The Applicant hereby asserts that the disclosure of this application may include more than one invention, and, in the event that there is more than one invention, that these inventions may be patentable and non-obvious one with respect to the other.

BRIEF DESCRIPTION OF THE DRAWINGS

The invention is explained in greater detail below with reference to the accompanying figures, wherein.

DESCRIPTION OF THE PREFERRED EMBODIMENT

Figure 1:
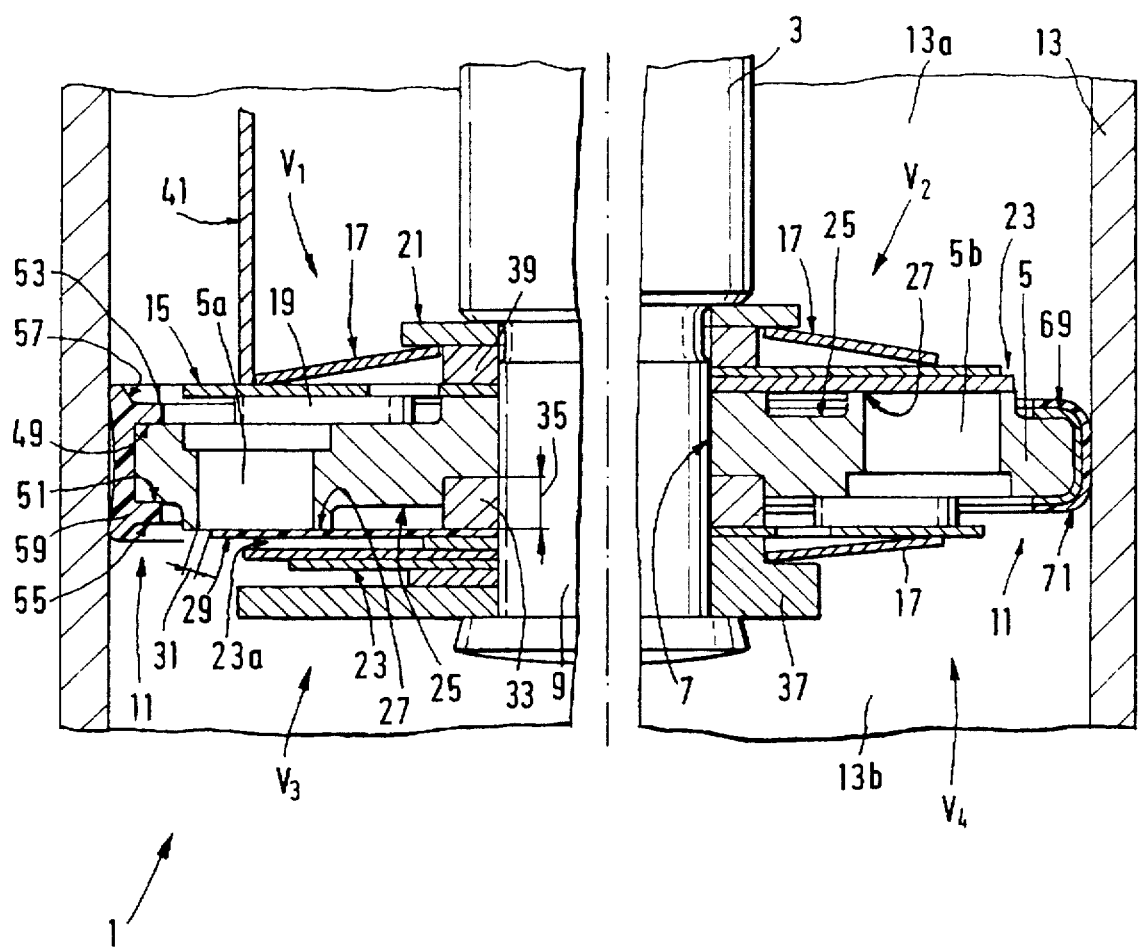
FIG. 1 is a cross sectional view of a vibration damper constructed according to the invention, illustrating four different valve arrangements in the four quadrants of the drawing.

FIG. 1 illustrates a vibration damper piston valve 1 on a piston rod 3. A piston 5 is centered by means of a central hole 7 on a piston rod pin 9. The piston 5 is realized in the form of a disc-shaped stamping and is surrounded by a piston ring 11. A cylinder tube 13, only portions of which are illustrated, is divided by the piston 5 into two work chambers 13a/13b. Valve discs separate fluid passage channels 5a/5b which, as a function of the stroke movement of the piston rod 3, allow damping medium to overflow from one work chamber into the other, whereby a damping force is generated.

In Variant $V_1$, a slotted valve disc 15 is used in combination with a plate spring 17. The slotted valve disc 15 has the opening action of a non-return valve, i.e., it is practically unbiased (or only biased with a relatively low biasing force). It is supported on support bodies 19 of the piston 5 and is centrally clamped in place. The plate spring 17 applies a bias force to the slotted valve disc 15. The plate spring 17 is thereby designed with a ratio h to $s \geq \sqrt{2}$ (that is, greater than or equal to the square root of 2) of the material thickness s to the deformation h, so that an approximately constant bias force can be maintained over a rather large bandwidth of the original installed position, corresponding to the distances between the slotted valve disc 15 and a support ring 21. On one hand, this arrangement results in a degressive damping force characteristic, and on the other hand, in an insensitivity to variations in tolerances of the individual parts which can influence the original installed position of the plate spring 17.

In Variant $V_2$, a degressive-linear characteristic is generated by applying a bias to a packet of flat valve discs 23 and in which pressure is applied by a plate spring 17. It must be essentially guaranteed that the valve discs 23 at the central hole 7 are at the same distance from the piston base 25 as at the support surfaces 27, since otherwise there will be major fluctuations in the damping force.

Variant $V_3$ has a piston valve, the damping force action of which is purely linear. An elastic first valve disc 29 thereby covers the outlet of the fluid passage channel 5a up to an advance opening 31. Even when there is a small flow, the first valve disc 29 is raised until an amount which is defined by a spacer disc 23a is exceeded, and the entire valve disc packet 23 is actuated. The spacer disc 23a is thereby designed to reduce the rattling noises which occur in particular in the event of small stroke movements of the piston rod 3 and are caused by the initial movement of the piston rod 3.

As indicated above with reference to Variant $V_2$, the support surfaces 27 must lie in a plane over the entire surface of the valve discs 29. For this purpose, a support ring 33 is introduced into the piston 5, the height of which is adapted to the distance between the support surfaces 27 and the piston base 25. During fabrication it is possible to measure a basic pin depth 35, and thereby select a support ring 33 from an inventory, the height of which corresponds exactly to the depth 35. In this manner, it becomes possible to tune even linear damping force valves accurately.

Variant $V_4$ is largely similar to Variant $V_1$, but one difference is the use of a separate thrust collar 37 which performs a centering and support function with respect to the plate spring 17 by means of its surfaces which face the plate spring 17. If, as in $V_1$, a separate centering and a support disc 39 were used, a centering sleeve 41 would have to be inserted during the assembly process on the rivet-head side for the plate springs 17, which would be unguided up to this stage of the assembly, before riveting the entire piston valve. It goes without saying that one of the Variants $V_1$ to $V_4$ can be realized as desired on each side of the piston 5, which means that a significant degree of standardization is possible.

FIGS. 2a to 2e show the piston 5 in isolation. The piston 5 is preferably a stamped part, on which, starting from an imaginary piston base body 5c, the deformations, e.g., for the support bodies 19, are realized so that the height H of the support bodies 19 is identical to the depth H of an entry 43 into the fluid passage channel 5a. The same is true for the area of the central hole 7, in which the pin base depth T for the support ring 33 is identical to the shoulder (or offset) 45 on the opposite side. Consequently, the corresponding diameters $D_1$, $D_2$ of the molded-on areas are also identical.

The strain hardening (or cold hardening, work hardening, etc.) which then occurs offers the basis for the low height of the piston.

The fluid passage channels 5a/5b in each direction of flow lie on different reference circles $r_1$, $r_2$ and $r_3$. The overhead views (FIGS. 2a, 2c) of the piston 5 show the hatch-marked support surfaces 27 on which the valve discs lie, as symbolized by the curve segment 47. The fluid passage channel on the largest reference circle $r_1$ thereby forms the advance opening cross section 31, whereby as the downward stroke of the valve disc increases, the passage cross section continuously increases to the desired extent, as the fluid passage channels lying radially farther inward on the reference circles $r_2$ and $r_3$ open.

Of course, the fluid passage channels 5a, 5b for the one direction of flow can lie on the radii of reference circles which are different from those in the opposite direction.

Figure 2A:
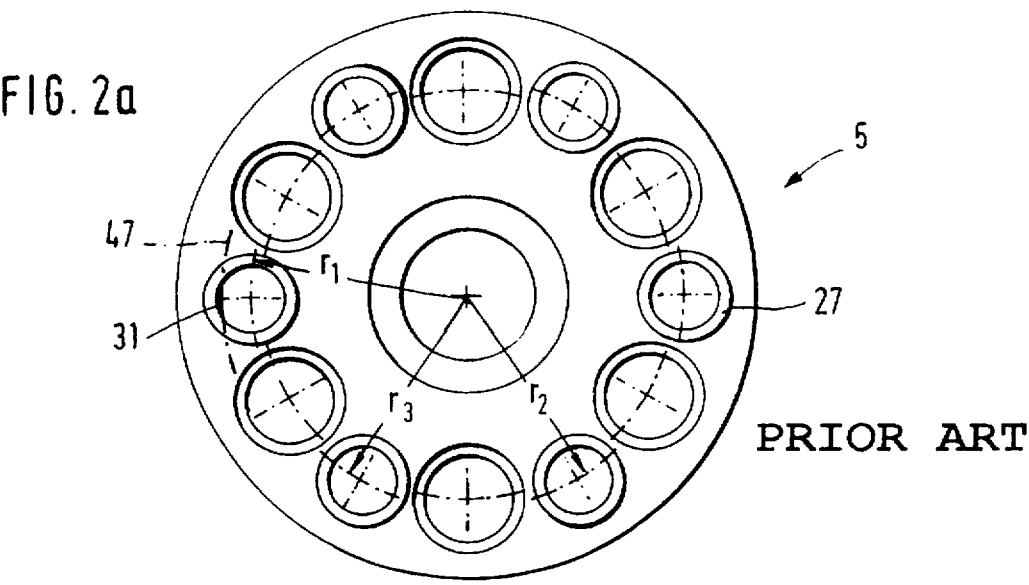
FIGS. 2a, 2b, 2c, 2d, and 2e illustrate details of the piston.
Figure 2B:
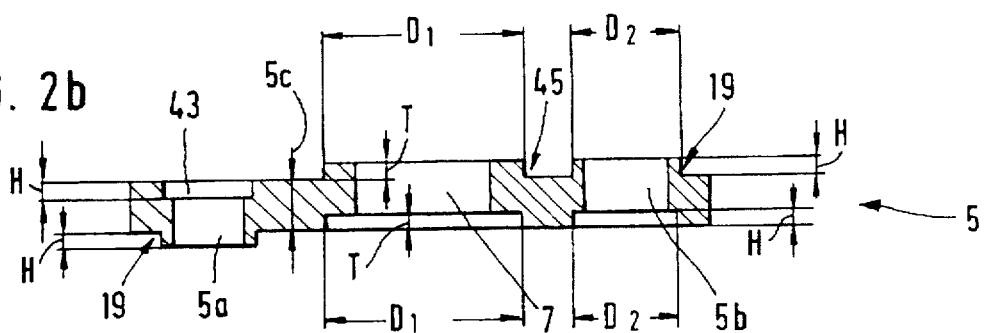
Figure 2C:
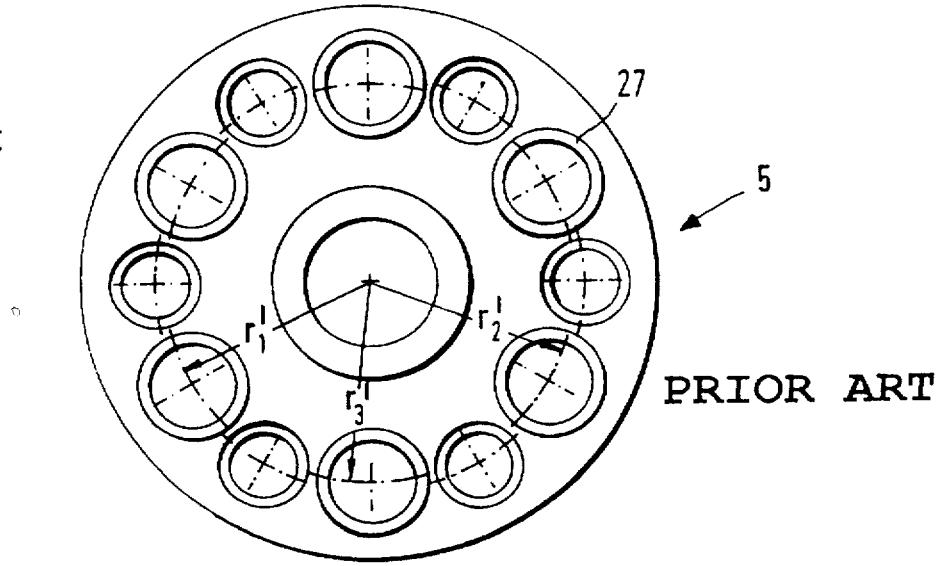
Figure 2D:
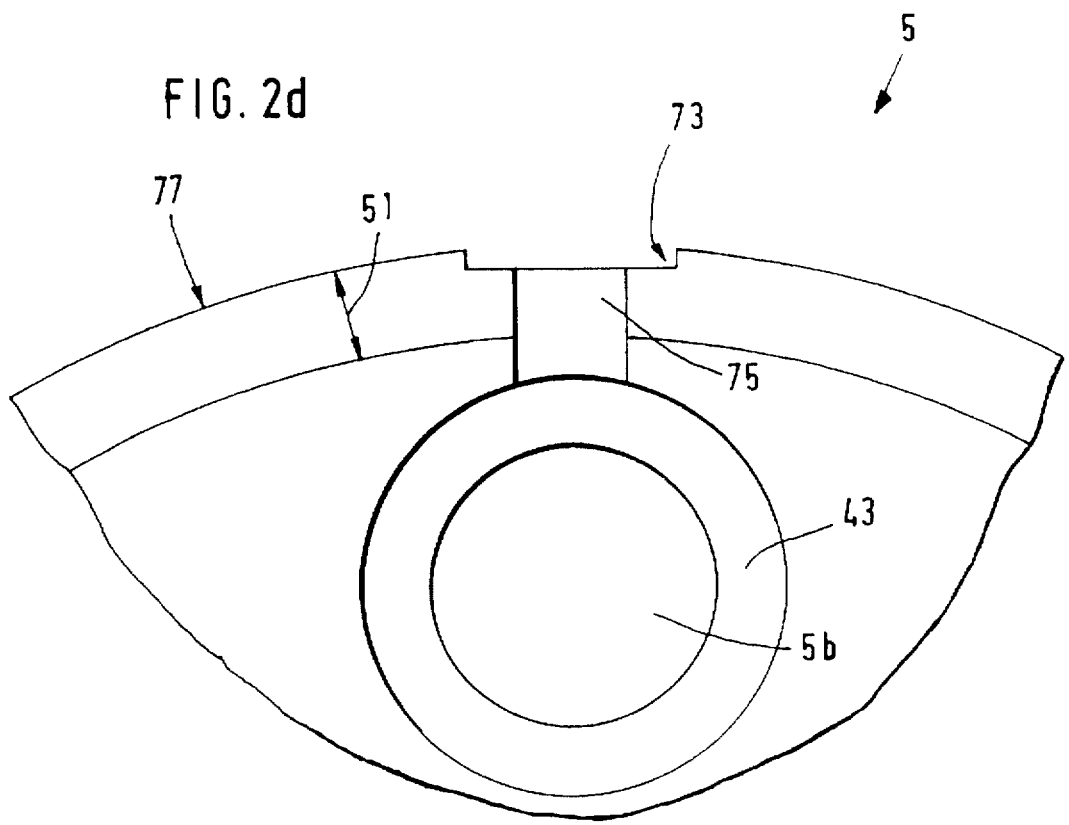
Figure 2E:
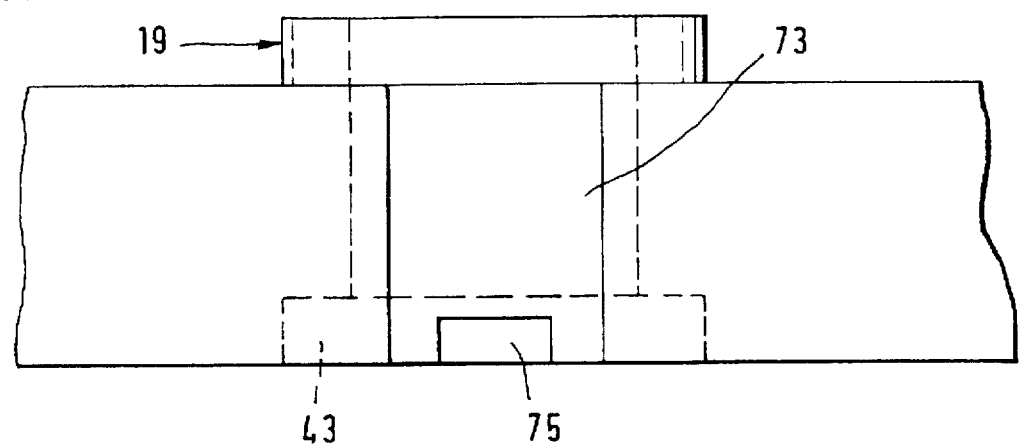

FIG. 2d shows a detail from FIGS. 2a and 2b in the vicinity of a fluid passage channel 5b. This enlargement shows an advance opening channel 73 which forms the connection between the upper side of the piston 5 and the lower side of the piston 5. In this embodiment, an inflow channel 75 is stamped into the piston body on the lower side of the piston 5 and extends from the entry 43 of the fluid passage channel 5b to the advance opening channel 73. The inflow channel 75 and the cover surface 55 determine a advance opening cross section which is effective in addition to the advance opening cross section 31 (FIG. 2a). The effective length of the advance opening cross section corresponds to the overlap between the cover surface 55 and the inflow channel 75. The inflow channel 75 has a smaller cross section and is significantly shorter than the advance opening channel 73, to restrict the damping action of the advance opening cross section to the inflow channel 75. The inevitable fluctuations in manufacturing tolerances inside the advance opening passage therefore have no effect on the advance opening cross section 31, and thus also have no effect on the damping force of the advance opening cross section 31 to be maintained. All the parts of the connection between the upper side of the piston and the lower side of the piston were deliberately worked into the piston body, to obtain a standardized piston ring 11.

The recess can be produced simply by inserting a tool insert into the stamping die for the piston body. The result is a standard piston body which can be provided as necessary with advance opening cross sections 31 which are a function of the direction of flow.

In the left half of FIG. 1, the piston 5 has a piston ring 11 which is made of plastic. The piston ring 11 is supported by means of corresponding retaining surfaces 49, 51 on the upper and lower sides respectively of the piston 5. Adjacent to the cover surfaces 53, 55 of the piston ring 11 are the sealing lips 57, 59 which are realized so that they are elastic and are in contact as a function of the operating pressure in the cylinder tube 13.

Figure 3:
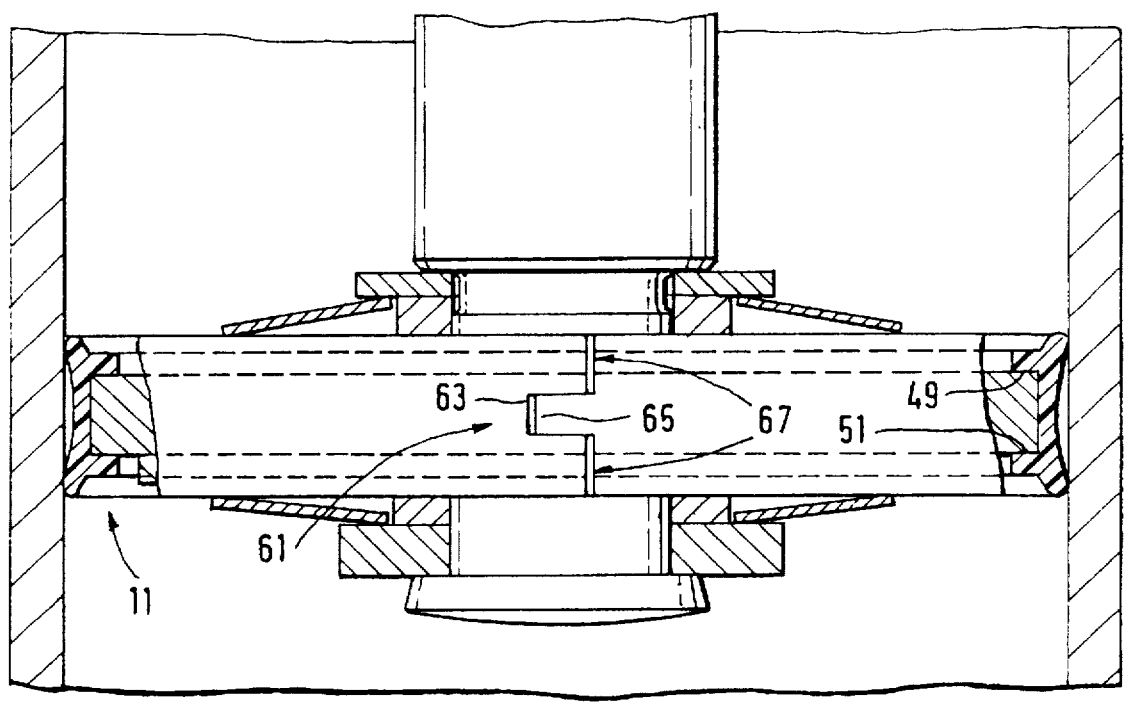
FIG. 3 shows the piston ring in elevational view.

Alternatively, however, rolled strip material can also be used, which closes the piston ring 11 by means of a piston ring joint 61. FIG. 3 shows such a variant embodiment, in which the one end of the piston ring 11 has a notch 63 which is at some distance from the top and bottom edge, in which notch 63 an extension 65 of the other end of the piston ring 11 is engaged.

When there is a stroke movement, damping medium necessarily penetrates into a vertical area 67 of the piston ring joint. The pressure acts on the extension 65 and exerts a force in the direction of flow on the extension 65. By means of the retaining surfaces 49, 51, the piston ring 11 is supported in the axial direction, so that the piston ring joint 61 cannot open. The piston ring joint 61 reacts correspondingly in the reverse direction of flow. Pistons which are taller also make it possible to install a plurality of such piston ring joints 61, so that a labyrinth seal is created.

In the right half of FIG. 1, a piston ring 11 is used which is realized in the form of two shells. In contact with the inside of the piston 5 is a reinforcement 69, on which an anti-friction layer 71 has been applied. The piston ring 11 has a U-shaped cross section and is supported by means of retaining surfaces 49, 51 on the upper and lower sides of the piston 5 respectively. In the as-delivered condition, the piston ring 11 is realized so that it is slightly larger than the cylinder tube 13, and is introduced during assembly by means of a device (or jig) (not shown), whereby the piston ring 11 has a radial bias with respect to the cylinder tube 13.

The reinforcement 69 increases the allowable transverse force and strength at elevated temperatures, whereby the anti-friction layer 71 guarantees favorable anti-friction characteristics. With regard to the piston ring joint 61, however, axial and diagonal piston ring joints like those illustrated in FIG. 3 can also be employed, in which case the wall thickness of the piston ring 11 will be the determining factor in selecting the most appropriate form of realization. Theoretically, the thicker the piston ring 11, the more likely it is that the variant with the T-shaped piston ring joint 61 illustrated in FIG. 3 will be used.

Figure 4A:
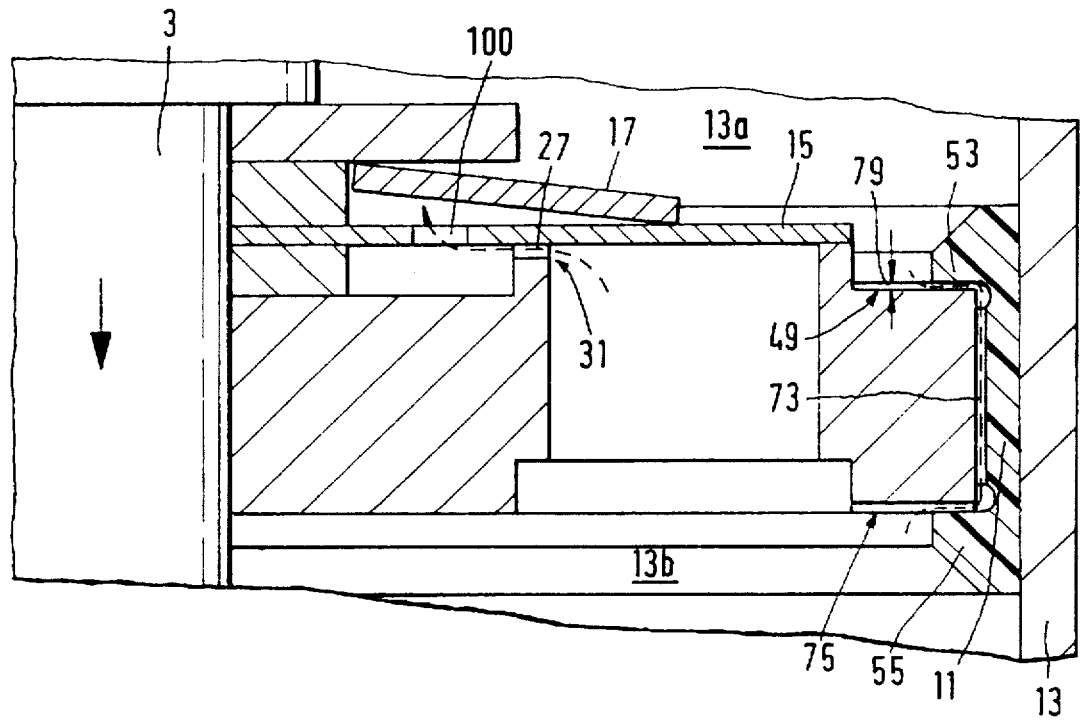
FIGS. 4a and 4b show the piston ring which can be moved axially to adjust the advance opening cross section.
Figure 4B:
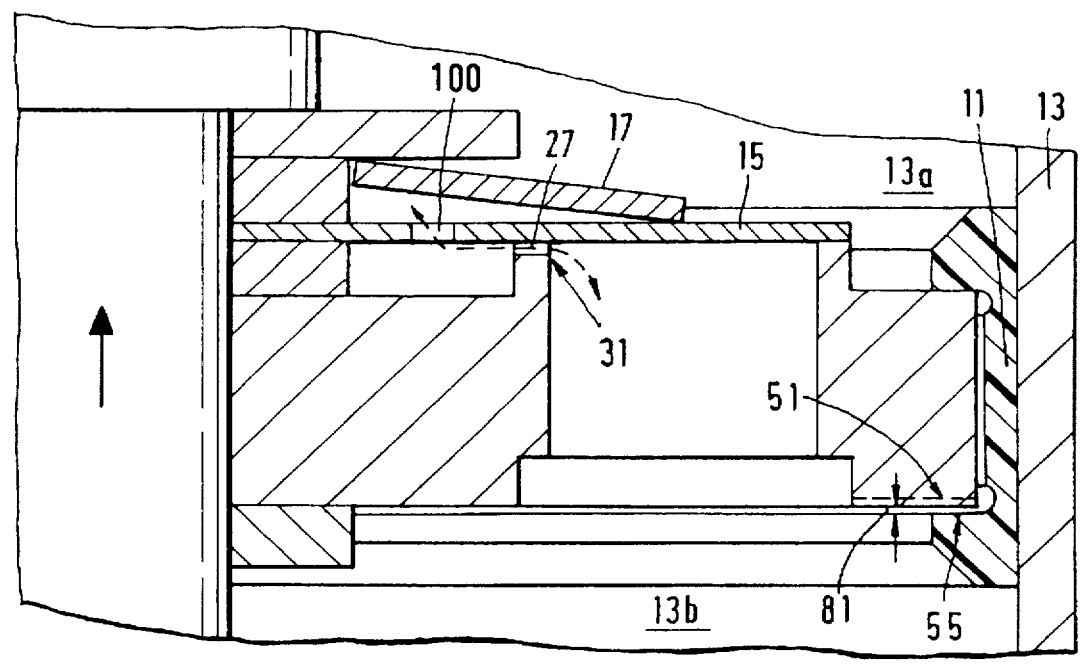

FIGS. 4a and 4b illustrate the interaction of the piston body, in particular of the flow connection of the advance opening between the upper side and the lower side of the piston 5, and the axially-movable piston ring 11. The schematic construction of the piston ring 11 corresponds to the realizations of the piston ring 11 illustrated in FIG. 1, although FIGS. 4a and 4b show only the piston ring embodiment illustrated in the left half of FIG. 1.

In the following explanation, it is always assumed that the piston ring 11 has a radial bias with respect to the cylinder tube 13. Moreover, the vertical web of the essentially U-shaped piston ring, which covers a peripheral surface 77 of the piston 5 (FIG. 2d) is larger than the height of the peripheral surface 77, so that the piston ring 11 can move axially relative to the piston. The relative movement is limited by retaining surfaces 49, 51 on the piston and cover surfaces 53, 55.

When the piston rod 3 moves into the cylinder tube 13, the volume of damping medium displaced by the piston rod flows from a work chamber 13b into the work chamber 13a. During this insertion movement, the axially-moving piston ring 11 is displaced by the friction force between the cylinder tube 13 and the piston ring 11 relative to the piston 5 toward the work chamber 13a. This axial movement is supported by the pressure on the surfaces of the piston ring 11 in the work chamber 13b. The inflow channel 75 worked into the underside of the piston 5 thereby always remains open. As shown in FIG. 4a, during the insertion movement of the piston rod 3, the damping medium can flow out of the work chamber 13b via the inflow channel 75 into the advance opening channel 73, and via a gap 79 between the retaining surface 49 of the piston 5 and the cover surface 53 of the piston ring 11 into the work chamber. The effective total advance opening cross section consists of the advance opening cross section 31, which in this embodiment is in the form of a groove inside the support body 19, and the inflow channel 75. The inflow channel 75 is switched in parallel to the advance opening cross section 31, and is controlled by the switchable piston ring 11 by means of the advance opening channel 73. When the piston rod 3 moves in the insertion direction, a relatively soft initial damping force characteristic is achieved, which is experienced by the passengers in the vehicle in the form of a particularly comfortable ride.

When the piston rod moves in the outward direction (FIG. 4b), the cover surface 53 of the piston ring and the retaining surface 49 of the piston 5 come into contact, with the consequence that no damping medium can flow via this connection. Only the advance opening cross section 31 is opened at low speeds of the piston rod 3. Of course, a gap 81 is formed between the retaining surface 51 of the piston and the cover surface 55 of the piston ring, which means that no damping medium can flow out. In the outward direction, only the advance opening cross section 31 is effective, so that the initial damping force characteristic is significantly steeper, and the vibrations of the wheel can be allowed to decay more rapidly. The axially-movable piston ring 11 results in two advantages. On the one hand, as described above, an effective advance opening cross section can be achieved which is a function of the direction of the flow. On the other hand, it is no longer necessary to axially fasten the piston ring to the piston.

As noted above, an additional advance opening, that is, an additional bypass damping fluid channel which permits passage of the damping fluid between the working chambers 13a and 13b, may be provided. This additional advance opening may take the form of, for example, the advance opening 31 described above with respect to variant $V_3$ or in other embodiments, the form of slots provided in the valve disk 15, as described above with respect to variant $V_1$. One embodiment illustrating the working of the additional advance opening provided by a slotted valve disk 15 is shown in FIGS. 4a and 4b. Here, the additional advance opening passes through grooves 31 provided in the raised support surfaces 27 provided on the piston body 5 which allow passage of the damping fluid from the fluid passage channels 5a/5b through to a slot 100 provided in slotted valve disk 15. The plate spring 17 may additionally be provided with throughgoing slots (or may alternatively be loosely fitted) to allow further passage of the damping fluid through to the working chambers 13a/13b.

Examples of shock absorber assemblies which may be utilized in accordance with the embodiments of the present invention may 0be found in the following U.S. Patents: U.S. Pat. No. 4,838,393; No. 4,817,928; No. 4,527,674; No. 4,962,916; and No. 4,756,516.

U.S. patent application Ser. No. 08/441,990 filed on Mar. 28, 1995 is hereby incorporated by reference herein.

Examples of processes which may be utilized in accordance with the embodiments of the present invention, may be found in the following U.S. Patents: U.S. Pat. No. 5,301,414 and No. 3,768,289.

Examples of control arrangements, which may be utilized in accordance with the embodiments of the present invention, may be found in the following U.S. Patents: U.S.

Pat. No. 4,989,148; No. 4,765,648; No. 4,664,409; No. 4,869,528; and No. 4,853,860.

One feature of the invention resides broadly in the vibration damper, the cylinder tube of which is divided into two work chambers by a piston which is fastened to a piston rod, whereby the piston comprises a piston body which has fluid passage channels which are covered by valve discs on supporting bodies with valve support surfaces, and the piston body is in a sliding or frictional connection by means of at least one piston ring with the cylinder tube, which piston ring covers the peripheral surface of the piston body and is axially supported respectively on the upper side and the lower side of the piston, whereby the piston body is realized in a disc-shape, is in one piece and is manufactured by stamping, whereby starting from the piston base body, the piston body areas which are raised on one side of the piston are realized as depressions on the axially opposite side of the piston, characterized by the fact that the piston ring 11 is realized so that it can move axially as a function of the direction of movement, and is actuated by the friction force between the cylinder tube 13 and the piston ring, whereby between the surfaces of the piston ring facing the piston and the piston, there is at least one advance opening cross section which is opened as a function of the axial position of the piston ring in relation to the piston body.

Another feature of the invention resides broadly in the vibration damper characterized by the fact that the switchable advance opening cross section is switched in parallel with an additional advance opening cross section 31.

Yet another feature of the invention resides broadly in the vibration damper characterized by the fact that the advance opening cross section is connected to a advance opening channel 73 in the vicinity of the peripheral surface 77 of the piston body connecting the upper side of the piston to the lower side of the piston, the passage of which is defined by the piston ring.

Still another feature of the invention resides broadly in the vibration damper characterized by the fact that the advance opening cross section is realized in the piston body.

A further feature of the invention resides broadly in the vibration damper characterized by the fact that the advance opening cross section has at least one inflow channel 75, the radial dimension of which, starting from the peripheral surface 77 of the piston body, is larger than cover surfaces 53, 55 of the piston ring on the piston.

Another feature of the invention resides broadly in the vibration damper characterized by the fact that each inflow channel 75 extends from the peripheral surface 77 to a fluid passage channel 5a, 5b in the same direction of flow.

The invention as described hereinabove in the context of the preferred embodiments is not to be taken as limited to all of the provided details thereof, since modifications and variations thereof may be made without departing from the spirit and scope of the invention.

What is claimed is:

1. A vibration damper, said vibration damper comprising:
   a cylinder, said cylinder having a longitudinal axis and an inner cylinder wall disposed about said longitudinal axis;
   the longitudinal axis extending in an axial direction;
   a piston member disposed within said cylinder and dividing said cylinder into first and second working chambers, said piston member having a peripheral surface disposed towards said inner cylinder wall;
   said piston member comprising a first face facing said first working chamber and a second face facing said second working chamber, said first and said second faces of said piston member being on opposing sides of said piston member, and said peripheral surface of said piston member having an axial length extending substantially between said first and second faces of said piston member;
   a piston rod connected to said piston member and extending through at least one of said first working chamber and said second working chamber to a point exterior of said cylinder;
   a damping fluid disposed in said first and second working chambers;
   at least one damping fluid passage passing through said piston member and connecting said first and second working chambers;
   an arrangement for damping the flow of said damping fluid between said first and second working chambers through said at least one damping fluid passage;
   a piston ring member disposed about said piston member and between said peripheral surface of said piston member and said inner cylinder wall of said cylinder;
   at least one additional damping fluid passage connecting said first and second working chambers, said at least one additional damping fluid passage being disposed at least partially between said piston ring member and said peripheral surface of said piston member;
   said piston ring member being configured to move on said piston member upon said piston member moving in the axial direction in said cylinder;
   said piston ring member and said piston member being configured to block at least a portion of said at least one additional damping fluid passage upon said piston member moving in a first axial direction direction along the axial direction;
   said piston ring member and said piston member being configured to unblock said at least a portion of said at least one additional damping fluid passage upon said piston member moving in a second axial direction along the axial direction;
   said first axial direction being opposite to said second axial direction;
   said at least one additional damping fluid passage comprising a groove disposed on said peripheral surface of said piston member; and
   said groove extending substantially from said first face of said piston member to said second face of said piston member.

2. A vibration damper according to claim 1, wherein said groove disposed on said peripheral surface of said piston member is a stamped groove.

3. A vibration damper according to claim 2, wherein:
   said groove disposed on said peripheral surface of said piston member is a first damping fluid channel; and
   said at least one additional damping fluid passage comprises a second damping fluid channel extending from said first damping fluid channel to one of said first and second working chambers.

4. A vibration damper according to claim 3, wherein said piston ring member comprises:
   a circumferential wall disposed adjacent to and substantially encircling said peripheral wall of said piston member;
   a first retaining surface extending radially inward from said circumferential wall toward said longitudinal axis;

said first retaining surface extending adjacent to said first face of said piston member; and a second retaining surface extending radially inward from said circumferential wall toward said longitudinal axis;

said second retaining surface extending adjacent to said second face of said piston member; and said circumferential wall of said piston ring member having an axial length between said first and second retaining surfaces which is substantially greater than said axial length of said peripheral wall of said piston member to permit said piston ring member to move on said piston member upon said piston member moving in the axial direction in said cylinder.

5. A vibration damper according to claim 4, wherein said piston ring member is in frictional engagement with said inner cylinder wall of said cylinder.

6. A vibration damper according to claim 5, wherein said second damping fluid channel comprises an indentation formed in one of said first and second faces of said piston member.

7. A vibration damper according to claim 6:

wherein said first retaining surface of said piston ring member extends at least partially over said indentation formed in said one of said first and second faces of said piston member;

wherein said first retaining surface of said piston ring extends radially inward toward said longitudinal axis of said cylinder from said circumferential wall of said piston ring member;

wherein said indentation extends radially inward toward said longitudinal axis of said cylinder from said peripheral wall of said piston member; and wherein said radially inward extension of said indentation being substantially greater than said radially inward extension of said first retaining surface.

8. A vibration damper according to claim 7:

wherein said indentation extends from said peripheral surface of said piston member to said at least one damping fluid passage passing through said piston member.

9. A vibration damper according to claim 8, wherein said vibration damper additionally comprises:

a second additional damping fluid passage connecting said first and second working chambers; and said second additional damping fluid passage accommodating flow between said first and second working chambers upon movement of said piston rod in both of said first and second directions of axial movement.

10. A vibration damper according to claim 2, wherein said vibration damper additionally comprises:

a second additional damping fluid passage connecting said first and second working chambers; and said second additional damping fluid passage accommodating flow between said first and second working chambers upon movement of said piston rod in both of said first and second directions of axial movement.

11. A vibration damper, said vibration damper comprising:

a cylinder, said cylinder having a longitudinal axis and an inner cylinder wall disposed about said longitudinal axis;

the longitudinal axis extending in an axial direction;

a piston member disposed within said cylinder and dividing said cylinder into first and second working chambers, said piston member having a peripheral surface disposed towards said inner cylinder wall;

said piston member comprising a first face facing said first working chamber and a second face facing said second working chamber, said first and said second faces of said piston member being on opposing sides of said piston member, and said peripheral surface of said piston member having an axial length extending substantially between said first and second faces of said piston member;

a piston rod connected to said piston member and extending through at least one of said first working chamber and said second working chamber to a point exterior of said cylinder;

a damping fluid disposed in said first and second working chambers;

a piston ring member disposed about said piston member and between said peripheral surface of said piston member and said inner cylinder wall of said cylinder;

a damping fluid passage connecting said first and second working chambers, said damping fluid passage being disposed at least partially between said piston ring member and said peripheral surface of said piston member;

said piston ring member being configured to move on said piston member upon said piston member moving in the axial direction in said cylinder;

said piston ring member and said piston member being configured to block at least a portion of said at least one additional damping fluid passage upon said piston member moving in a first axial direction along the axial direction;

said piston ring member and said piston member being configured to unblock said at least a portion of said at least one additional damping fluid passage upon said piston member moving in a second axial direction along the axial direction;

said first axial direction being opposite to said second axial direction;

said damping fluid passage comprising a groove disposed on said peripheral surface of said piston member; and said groove extending substantially from said first face of said piston member to said second face of said piston member.

12. A vibration damper according to claim 11, wherein said groove disposed on said peripheral surface of said piston member is a first damping fluid channel; and said damping fluid passage comprises a second damping fluid channel extending from said first damping fluid channel to one of said first and second working chambers.

13. A vibration damper according to claim 12, wherein said piston ring member comprises:

a circumferential wall disposed adjacent to and substantially encircling said peripheral wall of said piston member;

a first retaining surface extending radially inward from said circumferential wall toward said longitudinal axis;

said first retaining surface extending adjacent to said first face of said piston member;

a second retaining surface extending radially inward from said circumferential wall toward said longitudinal axis;

said second retaining surface extending adjacent to said second face of said piston member; and said circumferential wall of said piston ring member having an axial length between said first and second retaining surfaces which is substantially greater than the axial length of said peripheral wall of said piston member to permit said piston ring member to move on said piston upon said piston member moving in the axial direction in said cylinder.

14. A vibration damper according to claim 13, wherein said piston ring member is in frictional engagement with said inner cylinder wall of said cylinder.

15. A vibration damper according to claim 14, wherein said second damping fluid channel comprises an indentation formed in one of said first and second faces of said piston member.

16. A vibration damper according to claim 15:

wherein said first retaining surface of said piston ring member extends at least partially over said indentation formed in said one of said first and second faces of said piston member;

wherein said first retaining surface of said piston ring extends radially inward toward said longitudinal axis of said cylinder from said circumferential wall of said piston ring member;

wherein said indentation extends radially inward toward said longitudinal axis of said cylinder from said peripheral wall of said piston member; and wherein said radially inward extension of said indentation being substantially greater than said radially inward extension of said first retaining surface.

17. A vibration damper according to claim 16: wherein said vibration damper additionally comprises:

at least one further damping fluid passage passing through said piston member and connecting said first and second working chambers; and an arrangement for damping the flow of said damping fluid between said first and second working chambers through said at least one further damping fluid passage; and wherein said indentation extends from said peripheral surface of said piston member to said at least one further damping fluid passage passing through said piston member.

18. A vibration damper according to claim 17, wherein said vibration damper additionally comprises:

another damping fluid passage connecting said first and second working chambers; and said another damping fluid passage accommodating flow between said first and second working chambers upon movement of said piston rod in both of said first and second directions of axial movement.

19. A vibration damper according to claim 11, wherein said vibration damper additionally comprises:

another damping fluid passage connecting said first and second working chambers; and said another damping fluid passage accommodating flow between said first and second working chambers upon movement of said piston rod in both of said first and second directions of axial movement.

20. A vibration damper according to claim 11, wherein said groove disposed on said peripheral surface of said piston member is a stamped groove.

* * * * *

UNITED STATES PATENT AND TRADEMARK OFFICE
CERTIFICATE OF CORRECTION

PATENT NO.   : 5,785,160
DATED        : July 28, 1998
INVENTOR(S)  : Manfred GRUNDEI It is certified that error appears in the above-identified patent and that said Letters Patent is hereby corrected as shown below:

In column 6, line 55, after 'may', delete "Obe" and insert --be--.

Signed and Sealed this

Ninth Day of February, 1999

Attest:

*Attesting Officer*

*Acting Commissioner of Patents and Trademarks*